United States Patent

Lynott

[15] 3,706,857

[45] Dec. 19, 1972

[54] DISK CARTRIDGE WITH ROTATABLY ADJUSTABLE HEAD

[72] Inventor: John J. Lynott, Los Gatos, Calif.

[73] Assignee: International Business Machines Corporation, Armonk, N.Y.

[22] Filed: Jan. 5, 1971

[21] Appl. No.: 104,107

[52] U.S. Cl. ....................179/100.2 Z, 340/174.1 C

[51] Int. Cl. ..........................G11b 5/52, G11b 23/04

[58] Field of Search..179/100.2 C, 100.2 A, 100.2 T, 179/100.2 Z; 346/74 MD, 137; 274/41.4, 4 J, 9 RA; 340/174.1 C

[56] References Cited

UNITED STATES PATENTS

| | | | |
|---|---|---|---|
| 3,500,363 | 3/1970 | Shill | 340/174.1 C |
| 3,587,074 | 6/1971 | Angle | 340/174.1 C |
| 3,020,358 | 2/1962 | Richardson | 179/100.2 T |
| 3,402,403 | 9/1968 | Lichowsky | 179/100.2 T |

*Primary Examiner*—Bernard Konick
*Assistant Examiner*—Jay P. Lucas
*Attorney*—Hanifin and Jancin and Shelley M. Beckstrand

[57] ABSTRACT

A sealed cartridge; low cost disk memory system wherein the disk and the head rotate in parallel planes about offset axes. The disk contains a data band between first and second radii and is rotated about the first axis. The head is mounted for rotation about an axis which is offset from said first axis by at least one half the width of the data band, and less than the width of the data band.

11 Claims, 7 Drawing Figures

PATENTED DEC 19 1972 3,706,857

SHEET 1 OF 4

INVENTOR.
JOHN J. LYNOTT

BY

ATTORNEY

DISK CARTRIDGE WITH ROTATABLY ADJUSTABLE HEAD

BACKGROUND OF THE INVENTION

1. Field of the Invention

This invention relates to a magnetic recording and reproducing apparatus, and more particularly to means for positioning a transducer for cooperative engagement with any one of a selected number of record tracks on a magnetic recording medium or member.

2. Prior Art

The traditional method for positioning a magnetic transducer in cooperative relationship with a selected one of a plurality of concentric circular recording tracks of a magnetic surface of a disk is shown in U.S. Pat. No. 3,503,060 by W. A. Goddard et al. Therein, a motor rotates the disk about an axis at a constant speed. A loading means resiliently urges the transducer into transducing relationship with the recording surface. A positioner selectively positions the transducer at the track by movement along a line extending radially of the axis and parallel to the magnetic surface of the disk. In radial accessing methods of the type described in U.S. Pat. No. 3,503,060, complicated electro-mechanical or hydraulic actuators are required to carefully position the head to the selected track. Often these mechanisms require elaborate ways, and guides, and rotating lead screws, and so forth, which extend well beyond the outside diameter of the disk. In a small sealed cartridge type of memory system for a low cost file, it is highly desirable to simplify the head accessing mechanism and enclose the heads and disk within protective covers having a diameter approximating that of the recording disk. The sealed cartridge is necessary to achieve the clean environment required for lightly loaded, low mass contact or proximity recording for very high data densities.

Head accessing methods and mechanisms have been suggested in the prior art where the heads and the disks rotate about parallel offset axes. In one such arrangement, the axis of rotation of the heads lies outside of the outside diameter of the recording disk, and the head is rotated along an arc approximating the radial line of the disk. In an arrangement of this sort, the head positioning accuracy is extremely critical, requiring very complicated and expensive positioning apparatus. That is, to move the head from one track to the next, a very small angular displacement of the head about its axis is required. This is due to the relatively large radius of the head about its axis of rotation, and because the head rotates along an arc very nearly perpendicular to the data track.

Another head actuating method has been suggested where the head and the disk are rotated about parallel offset axes, and where the axis of rotation of the head intersects the recording surface of the disk. In such arrangements, the head is mounted on a very small radius which results in severe head skew problems in the regions of both the outside and inside diameters of the recording surface.

SUMMARY OF THE INVENTION

It is therefore an object of the invention to provide an improved transducer positioning device and head access mechanism.

It is a further object of the invention to provide a transducer positioning apparatus of improved simplicity in construction and reduced overall dimensions for utilization of a low cost, sealed cartridge memory file.

It is a further object of the invention to provide a transducer positioning apparatus wherein a relatively large rotation of the transducer about its axis of rotation is translated into a very small track-to-track movement with respect to the recording surface.

It is a further object of the invention to provide a head positioning apparatus having improved head skew characteristics at the inside and outside diameters of the recording surface.

The invention provides a storage disk having an information recording region between first and second radii and mounted for rotation about a first axis. Transducer means for reading or writing information in said region is mounted for rotation about a second axis. The first and second axes are offset by at least one-half and less than the full width of the information bearing region and by less than the radius of the innermost track. In a preferred embodiment, the heads and disk are contained within a sealed cartridge.

The foregoing and other objects, features, and advantages of the invention will be apparent from the following more particular description of the preferred embodiments of the invention as illustrated in the accompanying drawings.

DESCRIPTION

Figure 2:
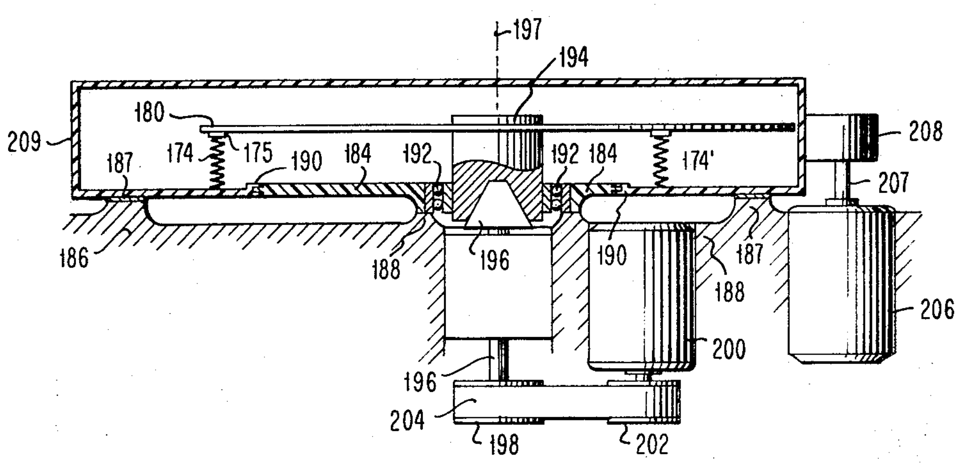
FIG. 2 is a partially sectioned diagrammatic view showing the sealed cartridge of FIG. 1 mounted for rotation of the disk and head about parallel offset axes.
Figure 1:
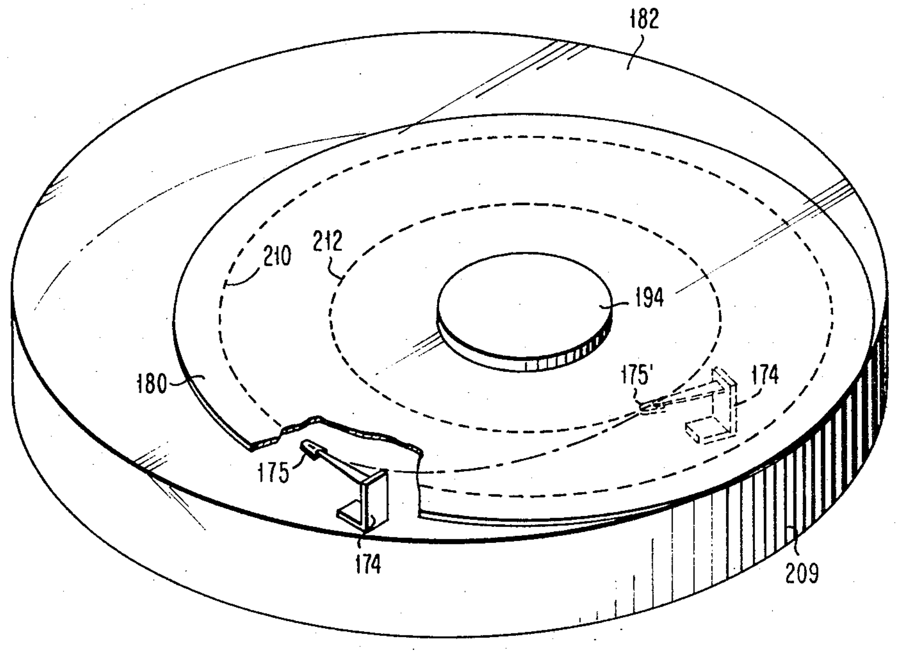
FIG. 1 is a pictorial representation of a preferred embodiment of the invention for a sealed cartridge disk and transducer.

Referring first to FIG. 1 in connection with FIG. 2, a description will be given of the sealed cartridge embodiment of the invention for achieving a very high density low cost data file.

To obtain a high density file, it is necessary to go to proximity (of contact) recording, as opposed to the traditional gliding shoe recording. The proximity recording approach permits very light head loading, in the order of 4 grams, as opposed to the very heavy loading (in the order of 4 pounds) required to force a gliding shoe into recording and reading relationship with a magnetic surface. A suitable head and mount is described in U.S. Pat. No. 3,177,495. With the read/write head mounted for proximity or contact recording against a head, a very critical controlled environment must be achieved to prevent damage to the head or the disk. This requires that both the disk and the head be sealed within a cartridge.

In the embodiment of FIG. 1, disk 180 and head 174 are sealed within cartridge cover 182, and cartridge base 184. Disk 180 is fixedly attached to hub 194 which is mounted within the cartridge for rotation within annular rotary seal 192. The cartridge cover 182 is mounted for rotation about the cartridge base 184 by annular rotary seal 190. When assembled for operation, hub 194 is mechanically linked to shaft 196, and cartridge base 184 is fixed to base 186 at portion 188 against rotation. The outside annular surface 209 of cartridge 182 is engaged by drive pinion 208, which drive pinion is actuated by step motor 206 through shaft 207. Drive motor 200 drives hub 202 which, through belt pulley 204 drives hub 198 which is fixedly attached to shaft 196. The bottom surface of cartridge 182 is supported for rotation on bearing surface ring 187.

In operation, motor 200 drives shaft 196 which causes disk 180 to rotate at a constant speed about axes 197. Step motor 206 steps cartridge 182 to access head 175 to various data tracks on disk 180 by effectively rotating head 175 about an axis parallel to and offset from axis 197. That the axis of rotation of head 175 is offset from axis 197 is apparent inasmuch as rotary seals 190 and 192 are circular but non-concentric.

Figure 3:
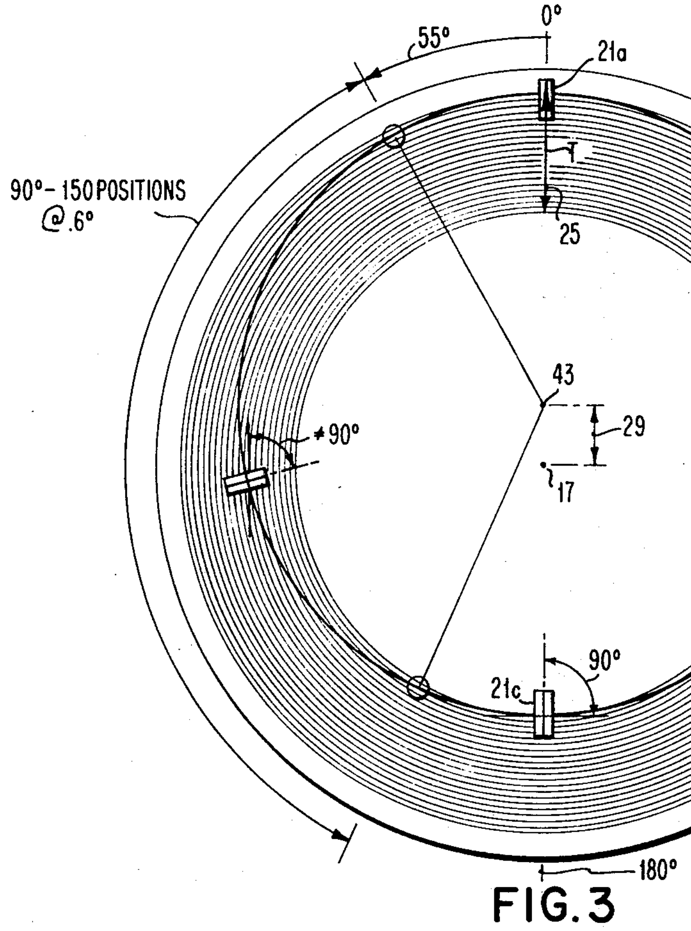
FIG. 3 is a schematic view showing the relationship between the offset axes, the data band, and the positioning of the head with respect to the concentric circular data track.

Referring now to FIG. 3, a description will be given of the relationship between the offset axes of rotation of the head and disk, and the positions of the data track in the data band. Disk 10 is mounted for rotation about axis 17. Head 21 is mounted for rotation about axis 43, and is shown in three positions as follows: at 0° angular displacement at 21A, 90° displacement at **21*b*, and 180° displacement at 21*c*. As shown at each location, the read/write gap of head 21 lies on the radius from the axis 43 to head 21. As shown at location 21*b* and, the read/write gap of head 21 is slightly non-perpendicular to the tangent to the data track at that location. That slight deviation from perpendicularity is referred to as gap skew. For the example shown in FIG. 3, the outside radius of the disk is 7 inches, the outermost data track diameter is 6.5 inches, 150 data tracks are located beneath the read/write gap when placed at 150 positions approximately 0.6° apart between 55° and 145° from position 21*a* and axes 17 and 43 are offset by slightly more than one half the data bandwidth, or the difference between the outside and inside data tracks. Under these conditions, the worst gap skew occurs as shown at position 21*b* or 90° offset from zero position at 21*a*** and that skew is less than 3°.

As will be obvious to those skilled in the art, the axes offset 29 will never be less than one half data bandwidth with 25 (or head 21 won't reach the outside track **11*a*). Also, the axes offset may be more than one half the data bandwidth 25 if the head 21, when on outside track 11*a*, is not a full 180° from its position when on the inside track 11*b*. The axes offset 29 may not be greater than data region width 25 due to the head skew and positional accuracy problems. As shown in FIG. 3, axis 17 is located inside inner track 11*b* such that head 21 is located at the extreme outside and inside positions 21*a* and 21*c*** when separated by 180° as explained above.

Figure 4:
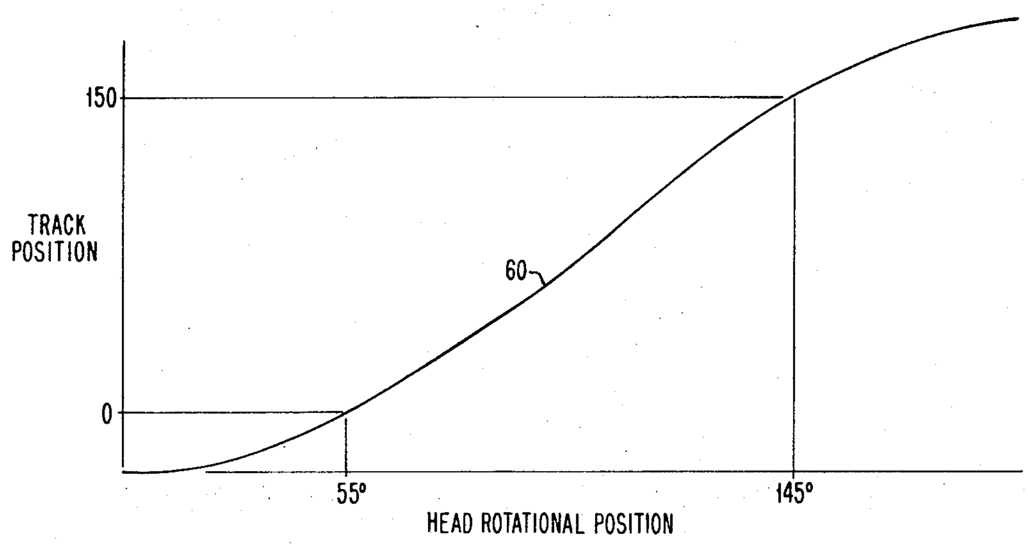
FIG. 4 is a graph showing the relationship between the track position and the head rotational position for the arrangement of the axes and track locations described in FIG. 3.

Referring now to FIG. 4, the relationship between track position and head rotational position is shown for the arrangement of FIG. 3.

Line 60 shows the relationship between the rack position and head rotational position of head 21. For the embodiment of FIG. 3, head 21 scans tracks 0 thru 150 as it is accessed in 0.6° increments between positions 55° and 145°. That curve 60 is slightly curved between 55° and 145° shows that there is a minute difference in track spacing from track to track. Also, it should be observed that about a 4:1 mechanical advantage is obtained between 55° and 145° in that head 21 must be moved along an arc approximately 4 times as long as the radial distance between adjacent tracks to move from one track to the next. Track zero is positioned beneath the head at 55° inasmuch as for a given angular displacement of the head, when it is positioned between zero and 55°, the radial distance traversed for a given angular displacement causes the tracks to crowd too close together. Similarly, for a given head rotation from one track to the next, data tracks positioned at greater than 145° would also be too crowded, for the example of FIG. 3.

Figure 6:
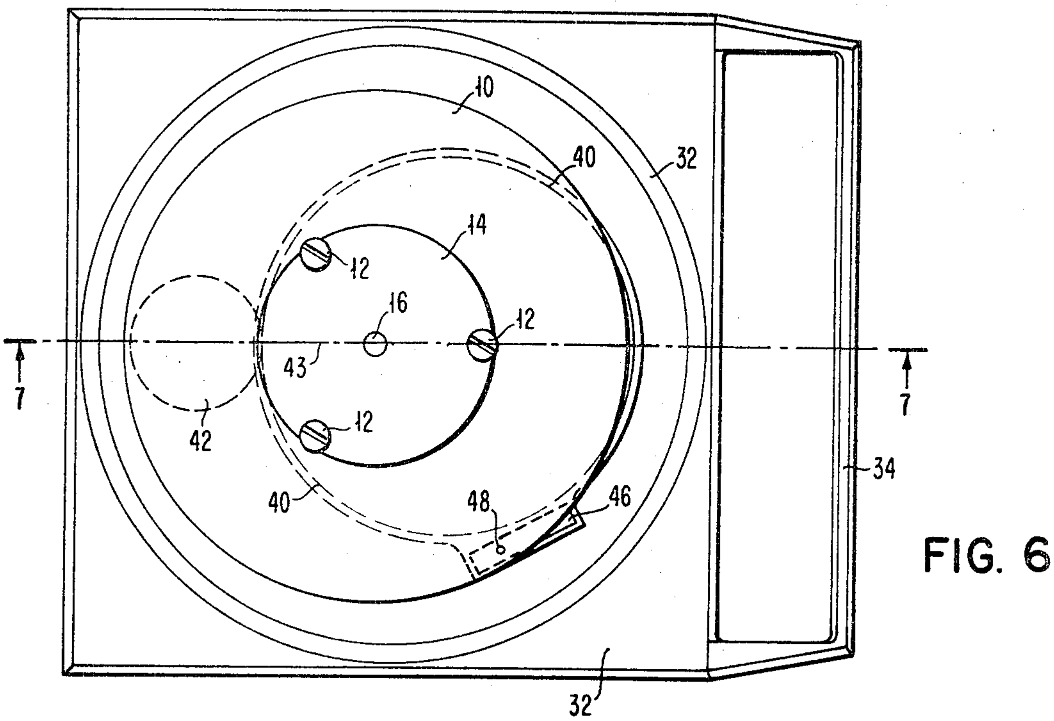
FIG. 6 is a top view of another embodiment of the invention for a single fixed disk inside a sealed cartridge.
Figure 7:
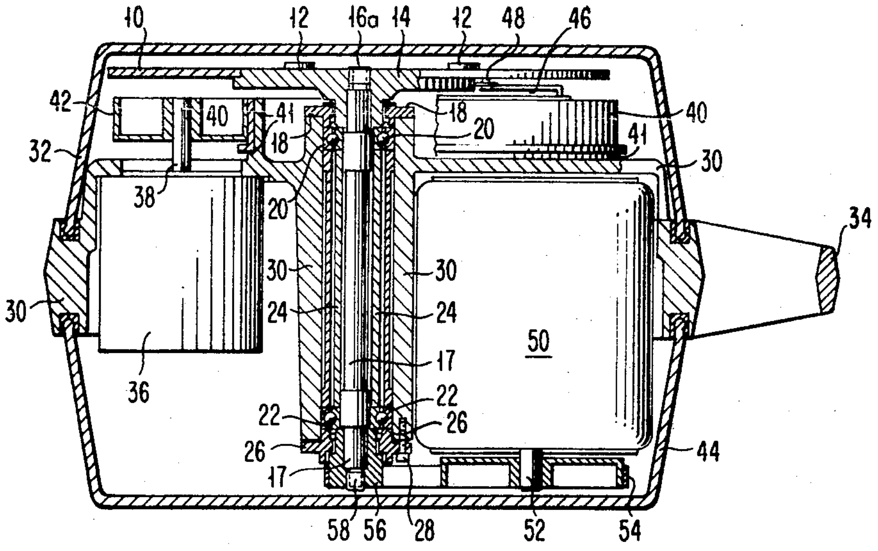
FIG. 7 is a sectional view of a sealed cartridge of FIG. 6 showing the disk and the heads mounted for rotation about offset parallel axes together with the head and disk drive motors contained within a sealed cartridge.

Referring now to FIGS. 6 and 7, a description will be given of that embodiment of the invention wherein a fixed disk and the associated drive head and the drive mechanisms for rotating the head and disk about parallel offset axes are sealed within a cartridge.

Referring first to FIG. 6, disk 10 is mounted by screws 12 to hub 14. Head 48 is mounted for reading and writing information on the surface of disk 10 by mounting block 46 which is attached to band 40. Band 40 is arranged on the outside of annular collar and rotated about said collar by drive wheel 42. The engagement between drive wheel 42 and 40 may be frictional, gear, or some other form as will be apparent to those skilled in the art.

Disk 10 rotates about axis 16 while the head 48 is caused to rotate about axis 43. Axes 16 and 43 are offset from and parallel to each other and perpendicular to the plane of the paper as viewed in FIG. 6. The entire mechanism is enclosed within outer case 32, to which is attached handle 34.

Referring now to FIG. 7, a more detailed explanation will be given of the cross sectional view of FIG. 6.

In this view, it will be seen that disk 10 is mounted to hub 14 by screw 12. Hub 14 is secured to shaft 17 by screw 16A. Shaft 17 is mounted for rotation within bearings 20 and 22, which bearings are separated by sleeve 24 and held in place by pins 18 and 26, respectively. Shaft 17 is enclosed within base 30, and collars 26 and 13 are secured to base by screws such as screw 28. Fixedly attached, to base 30, is motor 50, which drives shaft 52 and the hub 54. Hub 56 is attached to shaft 17 by screw 58, and a belt drive not shown interconnects hubs 54 and 56 such that motor 50 drives shaft 17 and disk 10 at a constant rotational velocity. Stepper motor 36 is also attached and incrementally drives shaft 38 and the drive hub 42. Drive hub 42 in turn rotates belt 40 about circular sleeve 41, which sleeve is a stationary extension of base 30 shaped to permit band 40 to travel along its outside circumference in a circular path about axis 43. Head 48 is attached to band 40 by mounting 46 which also applies a light loading force to engage head 48 against the recording surface of disk 10 so as to establish contact or proximity recording and writing relationship between the head and the disk.

In operation, stepper motor 36 is incremented to rotate belt 40 about sleeve 41 to position head 48 at the appropriate data track on disk 10. Disk 10 is rotated at a constant velocity by motor 50 through shaft 17. The head, disk, and drive mechanisms are all contained within sealed cover 32, which maintains the very clean environment necessary for the contact or proximity recording relationship between disk 10 and head 48, which relationship permits the high density objectives of a low-cost "mini" file.

As will be apparent to those skilled in the art, a track identification sector may be provided on each data track, and control means provided for sensing whether the magnetic transducer is properly positioned in cooperative relationship with a designated track, said control means also operable to move the stepping motor a variable number of steps to center the transducer over the track.

Figure 5:
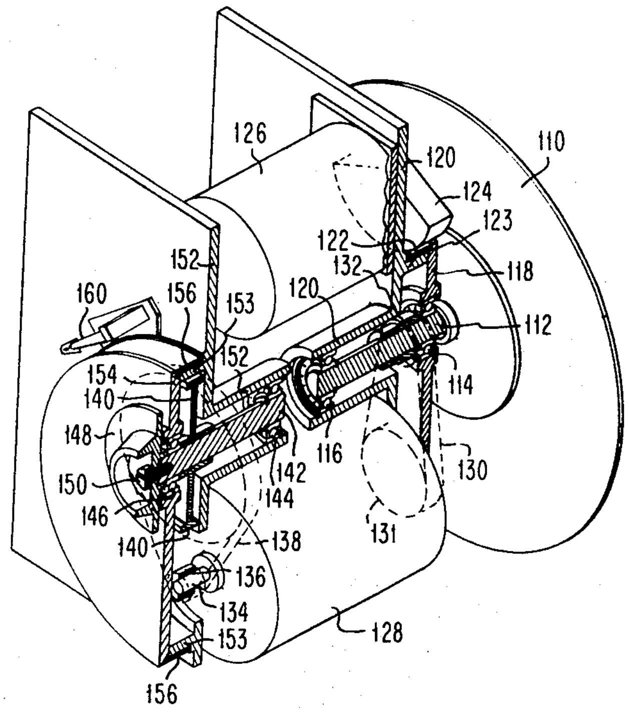
FIG. 5 is a partially cutaway diagrammatic view of another embodiment utilizing one fixed disk and a removable disk cartridge.

Referring now to FIG. 5, a description will be given of that embodiment of the invention wherein a first fixed disk 110 and a removable disk mounted on hub 148 may each be driven by a common motor 128, yet has the associated heads rotated about parallel and offset axes by independently operating stepping motors, one of which is shown at 126. In this embodiment, a low cost file is provided having a permanent storage disk 110 which may be utilized in connection with one of many different removable disks. Disk 110 is mounted for rotation with shaft 112, which shaft is rotatably mounted to base 120 by bearings 114 and 116. Mounted to shaft 112 is hub 132, which is connected by belt 130 to motor 128.

A removable disk, not shown, may be mounted over cone hub 148 and fixedly attached for rotation therewith. Cone 148 is mounted by pin 150 to shaft 142. Shaft 142 is mounted for rotation within base 120 by bearings 144 and 146. Fixedly attached to shaft 142 is hub 140 which is driven by belt 138 through hub 136 on shaft 134 of motor 128. Thus, as motor 128 drives belts 130 and 138, shafts 112 and 142 are driven at a constant relative velocity determined by the gearing ratio between hubs 136, 140, 132, and 131.

A magnetic head, not shown, is mounted to band 123, which is rotated about annular sleeve 122 by drive roller 124 which is operated by stepping motor 126. This arrangement, while not shown in its entirety, is similar to that described in connection with FIG. 7 for rotating head 48 about annular sleeve 41 on band 40.

Head 160 is mounted to band 156 which is also driven (in a manner similar to that described above) about sleeve 153 by a stepping motor (not shown).

In operation, while both disks 110 and that mounted on hub 148 are driven by a common motor 128, the associated heads are independently accessed to the selected data track by rotation of said heads about axes parallel to but offset from that of shafts 142 and 112.

While not shown, it will be apparent to those skilled in the art that a plurality of recording and reading heads, such as shown at 160, may be mounted to band 156 for rotation and positioning to multiple data tracks. By mounting different heads 160 at different radii with respect to the axis of rotation of the heads, heads 160 will access different data bands 25 (see FIG. 3) which may or may not overlap.

While not shown, it will be apparent to those skilled in the art that appropriate electronic leads may be attached to the various heads or transducers described and hooked to appropriate electronic circuitry for controlling the operation of said heads. The hookup may be by direct leads or by commutation.

The heads may be accessed from track to track by rotating said heads through a constant arc for each track, in which case there will be a slight variation in track to track spacing as described, or the head may be rotated through a varying arc depending upon the track location to achieve a constant track spacing. As will be apparent to those skilled in the art, various stepping motor controls may be adapted for each of these approaches, such as those suggested by U.S. Pat. Nos. 3,328,658, 3,482,155 and 3,374,410, or referenced therein.

In another embodiment of the invention, referring again to FIG. 3, a plurality of unit record tracks may be provided on the recording surface of disk 10. In this embodiment, disk 10 is held stationary while head 21 is rotated to scan a record track in the surface of disk 10, which track is along the circumference of a circle having axis 43, the axis of rotation of head 21. Disk 10 is incremented about axis 17 to position the selected record track beneath the head 21. Head 21 can be driven at a constant speed, and disk 10 actuated by, say, a stepping motor. Alternatively, head 21 can be stroked to scan a record track, and then stopped at home position while disk 10 is positioned for the next read/write scan.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. Apparatus for positioning a magnetic transducer in cooperative relationship with a selected one of a plurality of uniquely designated concentric circular recording tracks of a magnetic surface of a disk, comprising motive means operable to rotate said disk about a first axis at a constant speed;

cover means for enclosing said disk, mounting means secured to said cover means operable to maintain said magnetic transducer in operative relationship with said magnetic surface of said disk; and accessing means operable to selectively move said magnetic transducer along the circumference of a circle having a second axis parallel and noncolinear to said first axis;

said first and second axes being offset by a distance less than the difference, and at least as great as one-half the difference between the radii of the outermost and innermost recording tracks and less than the radius of the innermost recording track.

2. The apparatus of claim 1 wherein said accessing means rotates through less than 180° in moving said transducer from the outermost to the innermost recording track.

3. The apparatus of claim 2 wherein said accessing means comprises a step motor.

4. The apparatus of claim 3 wherein said accessing means rotates a given angular distance in moving said transducer between any pair of adjacent recording tracks.

5. The apparatus of claim 3 wherein said stepping motor rotates a variable angular distance to position said transducer over essentially equidistant concentric data tracks.

6. Apparatus for positioning a magnetic transducer in cooperative relationship with a selected one of a plurality of uniquely designated concentric recording tracks of a magnetic surface of a disk, comprising:

a cover;

a magnetic transducer mounted to said cover and in operative relationship with said magnetic surface of said disk;

motive means for rotating said disk about a first axis at a constant speed;

accessing means operable to rotate said cover about a second axis parallel and non-colinear to said first axis for positioning the transducer at said designated recording track, said first and second axes being separated by a distance, said distance being no greater than the difference between the radii of the outermost and innermost concentric recording tracks, being at least as great as one-half said difference, and being less than the radius of the innermost recording track.

7. The apparatus of claim 6 further comprising a plurality of transducers mounted in said cover in operative relationship with said magnetic surface.

8. The apparatus of claim 7 characterized by at least two of said transducers being mounted at different radii with respect to said second axis.

9. The apparatus of claim 6 wherein the accessing means comprises a stepping motor means for rotating said cover about said second axis and control means for determining the angle of rotation.

10. The apparatus of claim 9 wherein said stepping motor is moved a fixed number of steps for rotating the cover through a constant angle to move said transducer between any pair of adjacent recording tracks.

11. The apparatus of claim 9 wherein said control means further comprises means responsive to data read from said recording tracks for moving said stepping motor a variable number of steps to position said transducer over the selected recording track.

* * * * *